US008934045B2

(12) United States Patent
Karn et al.

(10) Patent No.: US 8,934,045 B2
(45) Date of Patent: Jan. 13, 2015

(54) DIGITAL CAMERA SYSTEM HAVING REMOTE CONTROL

(75) Inventors: Keith Stoll Karn, Avon, NY (US); Marc Krolczyk, Spencerport, NY (US); Kazuhiro Joza, Saitama (JP)

(73) Assignee: Apple Inc., Cupertino, CA (US)

( * ) Notice: Subject to any disclaimer, the term of this patent is extended or adjusted under 35 U.S.C. 154(b) by 296 days.

(21) Appl. No.: 13/417,565

(22) Filed: Mar. 12, 2012

(65) Prior Publication Data

US 2013/0235222 A1    Sep. 12, 2013

(51) Int. Cl.
*H04N 5/222* (2006.01)
*H04N 5/232* (2006.01)

(52) U.S. Cl.
USPC .............. 348/333.13; 348/333.02; 348/211.99

(58) Field of Classification Search
CPC ........... H04N 5/2259; H04N 5/23206; H04N 5/2628; H04N 2101/00; H04N 5/772
USPC ................... 348/211.99, 211.2, 211.3, 207.11
See application file for complete search history.

(56) References Cited

U.S. PATENT DOCUMENTS

| | | |
|---|---|---|
| 1,258,437 A | 3/1918 | Nord |
| 2,326,657 A | 8/1943 | Johnston |
| 3,971,065 A | 7/1976 | Bayer |
| 4,068,248 A | 1/1978 | Pizzuti et al. |
| 4,314,452 A | 2/1982 | Waters |
| 4,642,678 A | 2/1987 | Cok |
| 4,774,574 A | 9/1988 | Daley et al. |
| 5,189,511 A | 2/1993 | Parulski et al. |
| 5,198,849 A | 3/1993 | Hurai |
| 5,469,211 A | 11/1995 | Maruichi |
| 5,493,335 A | 2/1996 | Parulski et al. |
| 5,652,621 A | 7/1997 | Adams, Jr. et al. |
| 5,652,935 A | 7/1997 | Kusaka |
| 5,666,582 A | 9/1997 | Nakai et al. |
| 5,668,597 A | 9/1997 | Parulski et al. |
| 5,799,221 A | 8/1998 | Yamamoto et al. |
| 5,983,035 A | 11/1999 | Funaki |
| 6,192,162 B1 | 2/2001 | Hamilton, Jr. et al. |
| 6,288,742 B1 | 9/2001 | Ansari et al. |
| 6,292,218 B1 | 9/2001 | Parulski et al. |
| 6,545,587 B1 | 4/2003 | Hatakeyama et al. |
| 6,710,809 B1 | 3/2004 | Niikawa |
| 6,934,056 B2 | 8/2005 | Gindele et al. |
| 7,023,478 B2 | 4/2006 | MalloyDesormeaux |
| 7,046,275 B1 | 5/2006 | Yamada |
| 7,090,415 B2 | 8/2006 | Griga |
| 7,450,835 B2 | 11/2008 | Lackey et al. |
| 7,494,290 B2 | 2/2009 | Kim |

(Continued)

*Primary Examiner* — Tuan Ho
*Assistant Examiner* — Selam Gebriel
(74) *Attorney, Agent, or Firm* — Wong, Cabello, Lutsch, Rutherford & Brucculeri, LLP

(57) ABSTRACT

A digital camera system includes an image capture module and a remote control module. The image capture module includes an image capture system and a first wireless communication system. The remote control module includes a status display with one or more status display elements for displaying status information pertaining to the image capture module, a battery-operated power supply, one or more user controls, a second wireless communication, and a power management system providing a normal-power state and a low-power state. The system is configured such that when a user activates one of the user controls while the remote control module is in the low-power state the remote control module is set to operate in the normal-power state, a status inquiry is sent to the image capture module, and returned status information is displayed on the status display.

14 Claims, 8 Drawing Sheets

(56) References Cited

U.S. PATENT DOCUMENTS

| | | |
|---|---|---|
| 7,542,077 B2 | 6/2009 | Miki |
| 7,614,803 B2 | 11/2009 | Takeuchi |
| 7,688,360 B2 * | 3/2010 | Maeda .................. 348/231.1 |
| 7,764,320 B1 | 7/2010 | Salvato |
| 7,907,836 B2 | 3/2011 | Shinohara et al. |
| 8,386,817 B2 * | 2/2013 | Yamanaka et al. ............ 713/320 |
| 2002/0030744 A1 | 3/2002 | Sawachi |
| 2004/0032522 A1 | 2/2004 | Koeda |
| 2006/0061663 A1 * | 3/2006 | Park ...................... 348/211.2 |
| 2006/0221204 A1 | 10/2006 | Ogawa |
| 2006/0263066 A1 | 11/2006 | Matsumoto |
| 2007/0024931 A1 | 2/2007 | Compton et al. |
| 2007/0058074 A1 * | 3/2007 | Yamagishi ................ 348/372 |
| 2007/0109417 A1 * | 5/2007 | Hyttfors et al. .......... 348/211.99 |
| 2008/0024594 A1 | 1/2008 | Ritchey |
| 2009/0028527 A1 | 1/2009 | Jang |
| 2009/0034951 A1 * | 2/2009 | Kawasaki ................... 396/57 |
| 2009/0137274 A1 | 5/2009 | Kim |
| 2009/0213278 A1 | 8/2009 | Tsurumoto et al. |
| 2010/0060747 A1 | 3/2010 | Woodman |
| 2010/0141800 A1 | 6/2010 | Katayama |
| 2010/0306335 A1 * | 12/2010 | Rios et al. .................... 709/211 |
| 2011/0019079 A1 | 1/2011 | Saiki |
| 2011/0058052 A1 | 3/2011 | Bolton et al. |
| 2011/0309921 A1 * | 12/2011 | Tachibana ................. 340/425.1 |
| 2013/0093904 A1 * | 4/2013 | Wagner et al. ........... 348/207.11 |
| 2013/0235222 A1 | 9/2013 | Karn |
| 2013/0235226 A1 | 9/2013 | Karn |

* cited by examiner

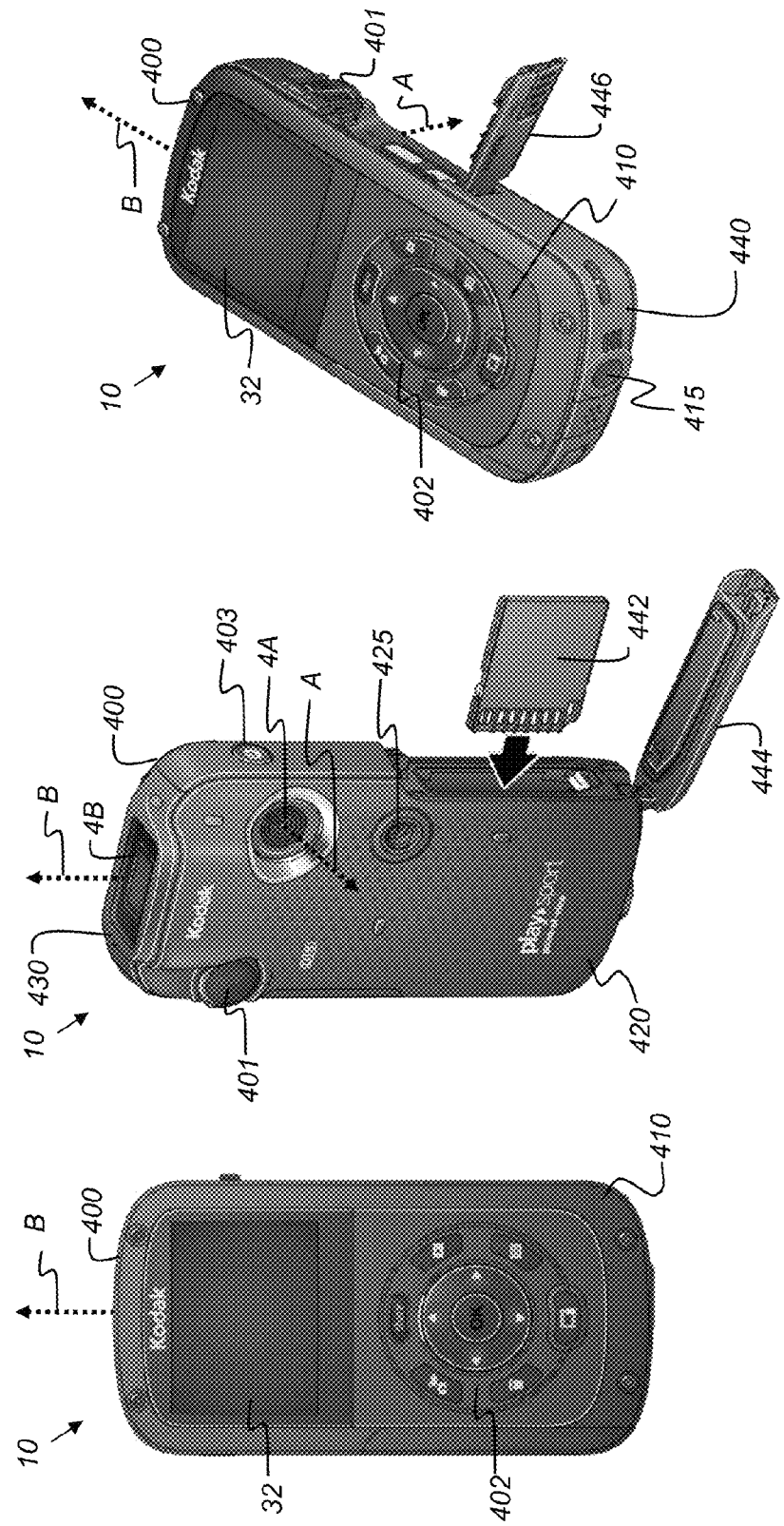

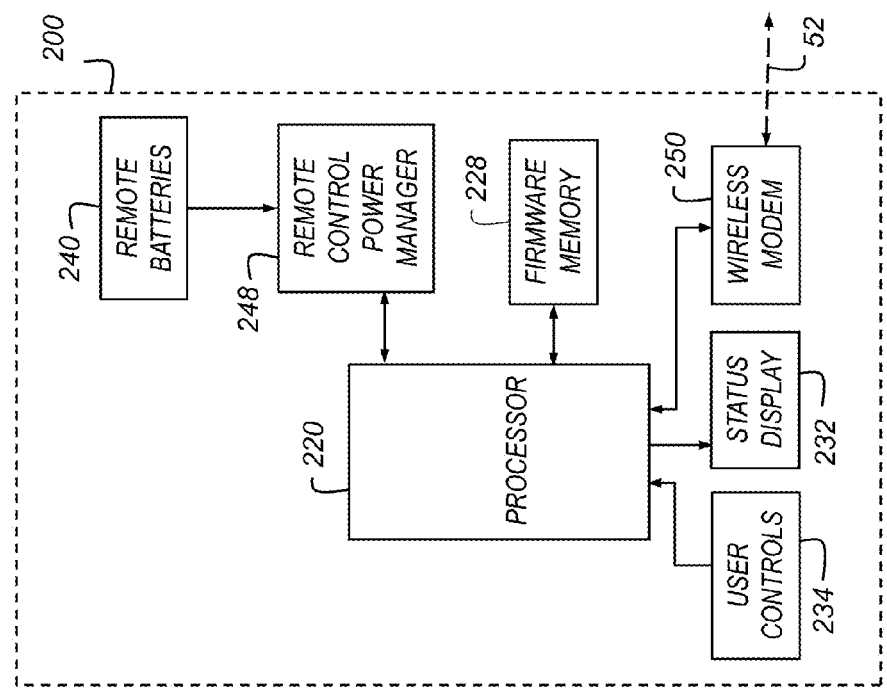
FIG. 7B
FIG. 7A

DIGITAL CAMERA SYSTEM HAVING REMOTE CONTROL

CROSS-REFERENCE TO RELATED APPLICATIONS

Reference is made to commonly assigned, co-pending U.S. patent application Ser. No. 13/417,571, entitled: "Digital camera system low power capture mode", by Karn et al.; and to commonly assigned, co-pending U.S. patent application Ser. No. 13/417,616, entitled: "Digital camera system having multiple capture settings", by Cucci et al., each of which is incorporated herein by reference.

FIELD OF THE INVENTION

This invention pertains to the field of digital video cameras, and more particularly to a digital camera having a remote control.

BACKGROUND OF THE INVENTION

Digital capture devices, such as digital cameras and camera phones typically capture and store both still digital images and video clips. These digital capture devices typically include a color display which is used to display captured still digital images and video clips. In many situations, these digital capture devices are held by the user, who uses the color display to compose the images as they are captured. In some situations, the digital capture device is mounted on a tripod or another type of camera mounting device, so that it does not need to be held by the user. In some situations, the digital capture device is controlled using a remote control, in order to initiate and terminate the capture of images.

It is known to provide rugged digital capture devices that can be secured to various objects, such as a bike helmet or scuba mask, or mounted to the handlebars of a motorcycle or the front of a surfboard. For example, the GoPro HD Hero2 digital cameras, sold by GoPro Inc, Half Moon Bay, Calif. are sold as part of an "Outdoor edition" package which includes various straps, pivot arms, and adhesive mounts to enable the digital camera to capture images while performing activities such as biking, skiing, skating and kayaking. However, the HD Hero2 camera includes only a single image capture system, which captures images using an optical axis directed outward from the "front" of the camera. This can cause excessive wind resistance and presents a high profile that is more susceptible to damage and image artifacts from vibrations in some situations.

It is also known to provide remote controls as accessories for digital cameras. For example, U.S. Patent Application Publication No. 2011/0058052 to Bolton, et al., entitled "Systems and methods for remote camera control" describes a portable media device (PMD) which includes a digital camera capable of capturing still images and video that can be controlled remotely using an accessory. The accessory can register with the PMD to automatically receive notifications whenever there is a change in the camera state. The camera states can include mode, operation status, and configuration settings. The accessory can send instructions to a camera application that interfaces with the camera to control the camera. The accessory can remotely activate the digital camera, change the digital camera's mode, and send instructions to operate the digital camera. The accessory and the PMD can concurrently control the camera. The PMD can send the captured still images and recorded video to the accessory for preview and can receive instructions from the accessory. Unfortunately, because the accessory receives notifications whenever there is a change in the camera state, power must be continuously supplied to ensure that a notification can be received by the accessory. This can rapidly deplete the batteries which control the accessory.

It is also known to provide a video camera having two lenses pointing in perpendicular directions, as described in U.S. Pat. No. 6,288,742 to Ansari et al., entitled "Video Camera Including Multiple Image Sensors." This patent describes a digital motion camera useful in teleconferencing which includes two lenses and two image sensors. The first lens is used to provide a relatively wide angle view of a room and the second lens is used to provide high resolution document transmission capability. During a video telephone conference, the camera permits fast switching between an image of the room as seen through the first lens or an image of a document as seen through the second lens, without the need for pan and tilt stages or a plurality of complete camera units. However, this camera is always mounted in the same orientation, regardless of which lens is used to capture images. The camera does not include multiple camera mounts to enable the camera to be mounted in different orientations when the second lens is used to capture images.

It is also known to provide a camera carrying case that includes more than one tripod screw socket on different sides of the cases, as described in U.S. Pat. No. 1,258,437 "Camera carrying case" to Nord. However, the case is designed for a camera having a single lens with a single optical axis. The two tripod screw sockets are used to capture landscape and portrait orientation images in the direction of this single optical axis.

Thus, there remains a need to provide a digital camera that can be used in a "conventional" capture mode, where the digital camera is held by the user while capturing digital images, and which can also be used in "streamlined" mounted mode, which provides a lower profile and reduced wind resistance when the digital camera captures images while mounted to moving object such as a bicycle.

SUMMARY OF THE INVENTION

The present invention represents a digital camera system, comprising:
an image capture module including:
  a first image capture system including:
    a first image sensor for capturing a digital image; and
    a first optical system for forming an image of a first portion of a scene onto the first image sensor; and
  a first wireless communication system; and
a remote control module including:
  a remote control status display including one or more remote control status display elements for displaying status information pertaining to the image capture module;
  a battery-operated power supply;
  one or more remote control user controls;
  a second wireless communication system for communicating with the first wireless communication system using a wireless interface; and
  a power management system providing a normal-power state where the remote control status display and the second wireless communication system are active and a low-power state where the remote control status display and the second wireless system are inactive;
wherein when none of the remote control user controls have been activated for a predefined first time interval the power management system sets the remote control module to operate in the low-power state;

and wherein when a user activates one of the remote control user controls while the remote control module is in the low-power state:

the power management system sets the remote control module to operate in the normal-power state;

the remote control modules sends a status inquiry to the image capture module using the second wireless communication system, and in response the image capture module sends status information back to the remote control module using the first wireless communication system; and the status information is displayed using the remote control status display elements of the remote control status display.

The present invention has the advantage that the image capture module can be controlled using the user controls on the remote control module.

It has the additional advantage that the remote control module enters a reduced power mode after a period of inactivity in order to conserve battery power.

BRIEF DESCRIPTION OF THE DRAWINGS

FIGS. 3A-3C is a drawing depicting different views of a digital camera in accordance with an embodiment of the present invention.

FIG. 7A is a high-level diagram showing the components of a remote control module in accordance with the present invention;

FIG. 7B is a drawing depicting a front view of the remote control module of FIG. 7A.

Figure 1:
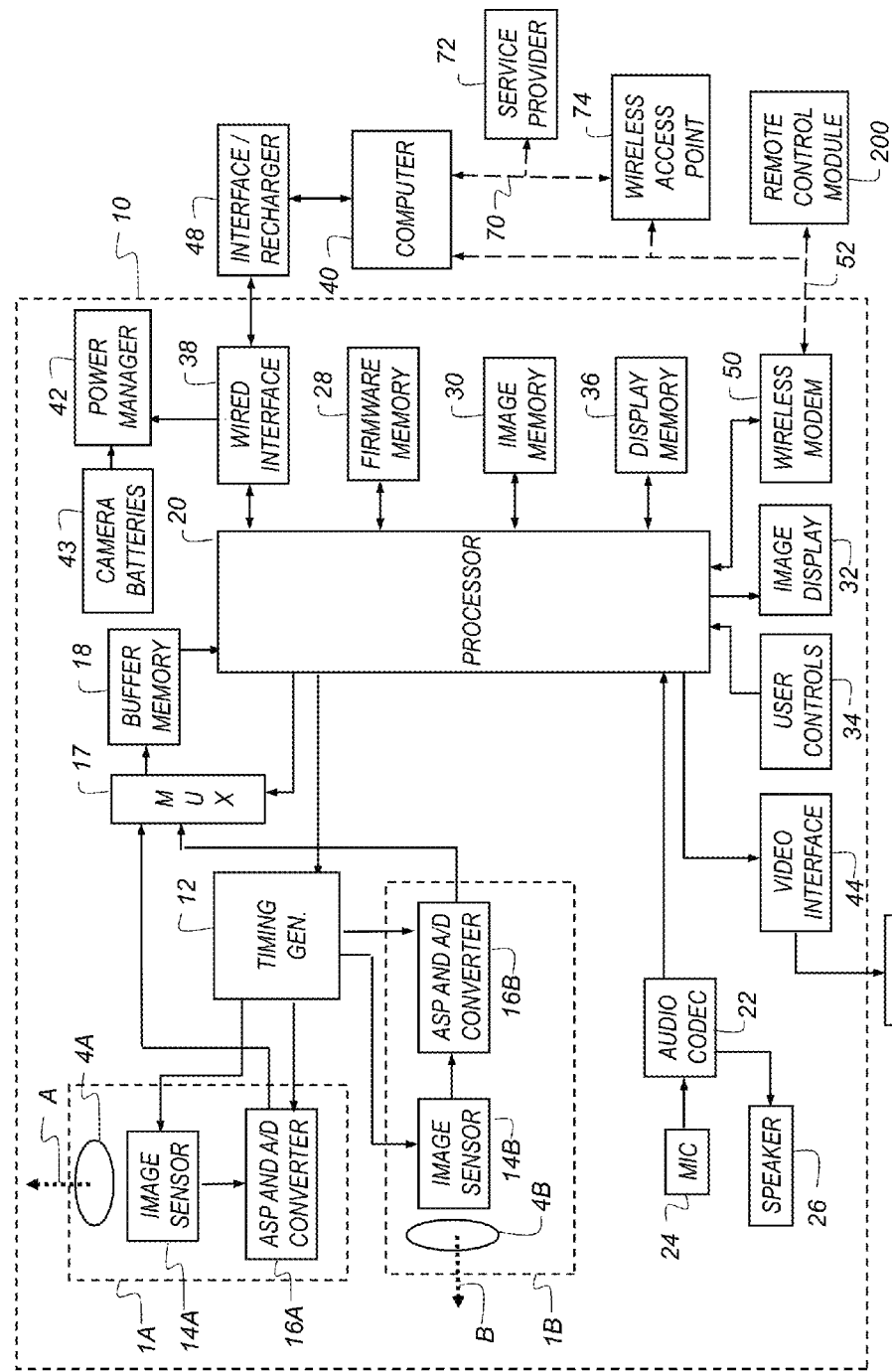
FIG. 1 is a high-level diagram showing the components of a digital camera including two image capture systems.

It is to be understood that the attached drawings are for purposes of illustrating the concepts of the invention and may not be to scale.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory, tangible computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The following description of a digital camera will be familiar to one skilled in the art. It will be obvious that there are many variations of this embodiment that are possible and are selected to reduce the cost, add features or improve the performance of the camera.

FIG. 1 depicts a block diagram of a digital photography system, including a digital camera 10. Preferably, the digital camera 10 is a portable battery operated device, small enough to be easily handheld by a user when capturing and reviewing images, as will be described later in reference to FIGS. 3A-3C. The digital camera 10 produces digital images that are stored as digital image files using image memory 30. The phrase "digital image" or "digital image file," as used herein, refers to any digital image file, such as a digital still image or a digital video file.

In some embodiments, the digital camera 10 captures both motion video images and still images. In some embodiments, the digital camera 10 can also be used to capture burst image sequences or time-lapse image sequences, where a plurality of digital images are captured at predefined or selectable time intervals. The digital camera 10 can also include other functions, including, but not limited to, the functions of a digital music player (e.g. an MP3 player), a mobile telephone, a GPS receiver, or a programmable digital assistant (PDA).

In some embodiments, the digital camera 10 includes a first image capture system 1A and a second image capture system 1B. The first image capture system 1A includes a first image sensor 14A and a first optical system comprising first lens 4A for forming an image of a scene (not shown) onto the first image sensor 14A, for example, a single-chip color CCD or CMOS image sensor. The first image capture system 1A has an optical axis A directed outward from the front of the first lens 4A. In some embodiments, the first lens 4A is a fixed focal length, fixed focus lens. In other embodiments, the first lens 4A is a zoom lens having a focus control and is controlled by zoom and focus motors or actuators (not shown). In some embodiments, the first lens 4A has a fixed lens aperture, and in other embodiments the lens aperture is controlled by a motor or actuator (not shown). The output of the first image sensor 14A is converted to digital form by Analog Signal Processor (ASP) and Analog-to-Digital (A/D) converter 16A, and the digital data is provided to a multiplexer (MUX) 17.

In a preferred embodiment, the second image capture system 1B includes a second image sensor 14B and a second optical system comprising a second lens 4B for forming an image of a scene (not shown) onto the second image sensor 14B, for example, a single-chip color CCD or CMOS image sensor. The second image capture system 1B has an optical axis B directed outward from the front of the second lens 4B. In some embodiments, the second lens 4B has the same focal length as the first lens 4A. In other embodiments, the second lens 4B has a different focal length (or a different focal length range if the first lens 4A and the second lens 4B are zoom lens). The second lens 4B can have a fixed lens aperture, or can have an adjustable aperture controlled by a motor or actuator (not shown). The output of the second image sensor 14B is converted to digital form by Analog Signal Processor (ASP) and Analog-to-Digital (A/D) converter 16B, and the digital data is provided to the multiplexer 17.

In other embodiments, the second image capture system 1B may use some or all of the same components as the first image capture system 1A. For example, the first image sensor 14A can be used for both the first and second image capture systems 1A and 1B, and a pivoting mirror can be used to direct light from the first lens 4A or the second lens 4B onto the first image sensor 14A.

The multiplexer 17 provides either the output of ASP and A/D converter 16A or the output of ASP and A/D converter 16B to a buffer memory 18, which stores the image data from either the first image capture system 1A or the second image capture system 1B. The image data stored in buffer memory 18 is subsequently manipulated by a processor 20, using embedded software programs (e.g., firmware) stored in firmware memory 28. The processor 20 controls the multiplexer 17 in response to user inputs provided using user controls 34 in order to determine whether the first image capture system 1A or the second image capture system 1B is used to capture images.

In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using a wired interface 38 or a wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The first image sensor 14A and the second image sensor 14B are controlled by a timing generator 12, which produces various clocking signals to select rows and pixels and synchronizes the operation of the ASP and A/D converters 16A and 16B. The first image sensor 14A can have, for example, 12.4 megapixels (e.g., 4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in U.S. Pat. No. 3,971,065, entitled "Color imaging array," to Bayer, the disclosure of which is incorporated herein by reference. As a second example, the different color pixels can be arranged as described in U.S. Patent Application Publication No. 2007/0024931 to Compton and Hamilton, entitled "Image sensor with improved light sensitivity," the disclosure of which is incorporated herein by reference. These examples are not limiting, and many other color patterns may be used. The second image sensor 14B can have the same number of pixels as the first image sensor 14A, or can have a different number of pixels.

It will be understood that the first image sensor 14A, the timing generator 12, and ASP and A/D converter 16A can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

When selected by the multiplexer 17, the first image sensor 14A or the second image sensor 14B are effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski et al., entitled "Electronic camera for initiating capture of still images while previewing motion images," which is incorporated herein by reference.

The first image sensor 14A and the second image sensor 14B are also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The exposure level is controlled by controlling the exposure periods of the first image sensor 14A and the second image sensor 14B via the timing generator 12, and the gain (i.e., ISO speed) setting of the ASP and A/D converters 16A and 16B. In some embodiments, the processor 20 also controls one or more illumination systems (not shown), such as a flash unit or an LED, which are used to selectively illuminate the scene in the direction of optical axis A or optical axis B, to provide sufficient illumination under low light conditions.

In some embodiments, the first lens 4A and the second lens 4B of the digital camera 10 can be focused in the first mode by using "through-the-lens" autofocus, as described in U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers (not shown) to adjust the focus position of the first lens 4A or the second lens 4B to a number of positions ranging between a near focus position to an infinity focus position, while the processor 20 determines the closest focus position which provides a peak sharpness value for a central portion of the image captured by the corresponding first image sensor 14A or second image sensor 14B. The focus distance can be stored as metadata in the image file, along with other lens and camera settings.

The processor 20 produces menus and low resolution color images that are temporarily stored in display memory 36 and are displayed on image display 32. The image display 32 is typically an active matrix color liquid crystal display (LCD), although other types of displays, such as organic light emitting diode (OLED) displays, can be used. In some embodiments, the display 32 may be detachable from the main body of the digital camera 10, or can be on a separate unit. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 includes various user control elements which can be selected by user controls 34. The user controls 34 are used to select the first image capture system 1A or the second image capture system 1B, to select various camera modes, such as video capture mode, still capture mode, and review mode, and to initiate capture of still images and the recording of motion images. The user controls 34 are also used to turn on the camera and initiate the image/video capture process. User controls 34 typically include some combination of buttons, rocker switches, joysticks, or rotary dials. In some embodiments, some of the user controls 34 are provided by using a touch screen overlay on the image display 32 having one or more touch-sensitive user control elements.

An audio codec 22 connected to the processor 20 receives an audio signal from a microphone 24 and provides an audio signal to a speaker 26. These components can be to record and playback an audio track, along with a video sequence or still image. If the digital camera 10 is a multi-function device such as a combination camera and mobile phone, the microphone 24 and the speaker 26 can also be used for other purposes such as telephone conversation. In some embodiments, microphone 24 is capable of recording sounds in air and also in an underwater environment when the digital camera 10 is used to record underwater images. In other embodiments, the digital camera 10 includes both a conventional air microphone as well as an underwater microphone (hydrophone) capable of recording underwater sounds.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 52 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB still image data which is compressed and stored within a "finished" image file, such as a well-known Exif-JPEG still image file, in the image memory 30 and also to produce rendered video image data which is compressed and stored within a digital video file, such as the well-known H.264 video image file.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to recharge a set of camera batteries 43 which supply power to a camera power manager 42 in the digital camera 10.

The camera power manager 42 provides both a normal image capture mode and a low-power image capture mode. In the normal image capture mode, power is supplied to the image display 32 as images are captured, since the viewer is typically using the image display 32 to compose the captured images while holding the digital camera 10. In the low-power image capture mode, power is not supplied to the image display 32 in order to conserve battery power by not displaying images on the image display 32. Since the digital camera 10 is typically mounted (e.g. to a bike or another moving device) when the low-power image capture mode is used, the user is not in a position to view the image display 32, so providing images to the image display 32 is wasteful.

The digital camera 10 includes a wireless modem 50, which communicates with a remote control module 200 over a wireless network 52. The wireless modem 50 can use various wireless interface protocols, such as the well-known Bluetooth wireless interface or the well-known 802.11 wireless interface, or various proprietary protocols. In some embodiments, the digital camera 10 can communicate over the wireless network 52 with a wireless modem (not shown) in computer 40, in order to transfer captured digital images to the computer 40. In some embodiments, the digital camera 10 can transfer images (still or video) to a wireless access point 74 in order communicate via the Internet 70 with a service provider 72, such as Facebook, Flickr, YouTube or the Kodak EasyShare Gallery, to transfer images. Other devices (not shown) can access the images stored by the service provider 72 via the Internet 70, including the computer 40.

In alternative embodiments, the wireless modem 50 communicates over a radio frequency (e.g., wireless) link with a mobile phone network (not shown), such as a 3GSM network, which connects with the Internet 70 in order to upload digital image files from the digital camera 10. These digital image files can be provided to the computer 40 or the service provider 72.

In some embodiments, the digital camera 10 is a water proof digital camera capable of being used to capture digital images underwater and under other challenging environmental conditions, such as in rain or snow conditions. For example, the digital camera 10 can be used by scuba divers exploring a coral reef or by children playing at a beach. To prevent damage to the various camera components, in these embodiments the digital camera 10 includes a watertight housing (not shown).

Figure 2:
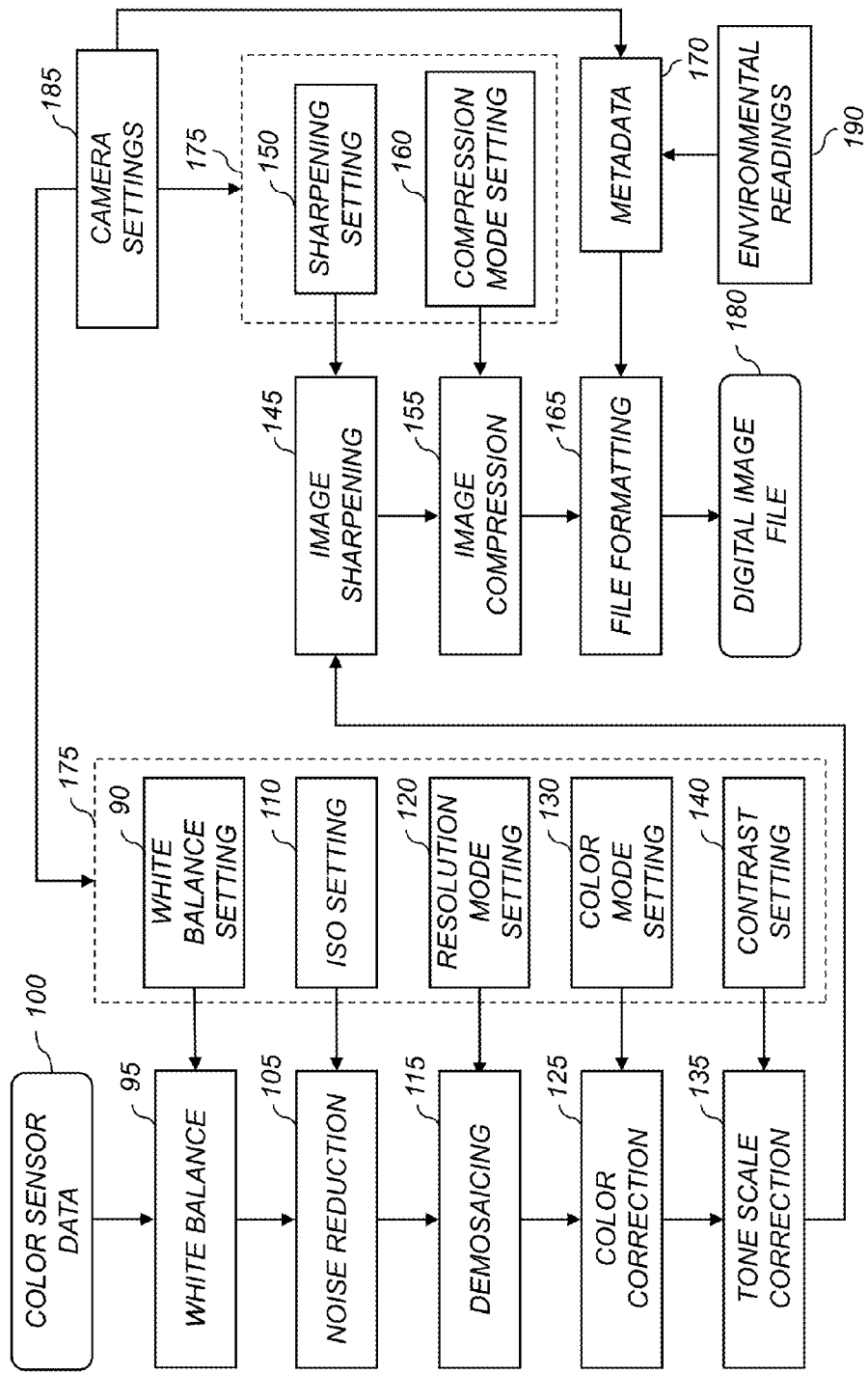
FIG. 2 is a flow diagram depicting typical image processing operations used to process digital images in the digital camera of FIG. 1.

FIG. 2 is a flow diagram depicting image processing operations that can be performed by the processor 20 (FIG. 1) in the digital camera 10 (FIG. 1) in order to process color sensor data 100 from the first image sensor 14A output by the ASP and A/D converter 16A or from the second image sensor 14B output by the ASP and A/D converter 16B. In some embodiments, the processing parameters used by the processor 20 to manipulate the color sensor data 100 for a particular digital image are determined by various user settings 175, which are typically associated with photography modes that can be selected via the user controls 34 (FIG. 1), which enable the user to adjust various camera settings 185 in response to menus displayed on the image display 32 (FIG. 1). In a preferred embodiment, the user control elements available in the menus are adjusted responsive to sensed environmental conditions.

The color sensor data 100 which has been digitally converted by the ASP and A/D converter 16A or the ASP and A/D converter 16B is manipulated by a white balance step 95. In some embodiments, this processing can be performed using the methods described in commonly-assigned U.S. Pat. No. 7,542,077 to Miki, entitled "White balance adjustment device and color identification device," the disclosure of which is herein incorporated by reference. The white balance can be adjusted in response to a white balance setting 90, which can be manually set by a user, or can be automatically set to different values when the camera is used in different environmental conditions.

The color image data is then manipulated by a noise reduction step 105 in order to reduce noise from the first image sensor 14A or the second image sensor 14B. In some embodiments, this processing can be performed using the methods described in U.S. Pat. No. 6,934,056 to Gindele et al., entitled "Noise cleaning and interpolating sparsely populated color digital image using a variable noise cleaning kernel," the disclosure of which is herein incorporated by reference. In some embodiments, the level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In some embodiments of the present invention, the demosaicing step 115 can use the luminance CFA interpolation method described in U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in U.S. Pat. No. 4,642,678, entitled "Signal processing method and apparatus for producing interpolated chrominance values in a sampled color image signal," to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g., 3,000×2,000 pixels), medium size (e.g., 1,500×1000 pixels) or small size (e.g., 750×500 pixels).

The color image data is color corrected in color correction step 125. In some embodiments, the color correction is provided using a 3×3 linear space color correction matrix, as described in U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

Setting 5 (nominal underwater color reproduction)

$$\begin{bmatrix} R_{out} \\ G_{out} \\ B_{out} \end{bmatrix} = \begin{bmatrix} 3.00 & -0.30 & -0.20 \\ -0.80 & 1.80 & -0.40 \\ -0.40 & -0.20 & 1.40 \end{bmatrix} \begin{bmatrix} R_{in} \\ G_{in} \\ B_{in} \end{bmatrix} \quad (5)$$

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness," 1.0 for "normal sharpness," and 0.5 for "low sharpness" levels, responsive to a sharpening setting 150 selected by the user of the digital camera 10. In some embodiments, different image sharpening algorithms can be manually or automatically selected, depending on the environmental condition.

The color image data is also manipulated by an image compression step 155. In some embodiments, the image compression step 155 can be provided using the methods described in U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and F/# of the lens, and whether or not the camera flash fired. In some embodiments, the metadata 170 can also include one or more environmental readings 190 provided by appropriate environmental sensors associated with the digital camera 10. For example, an underwater sensor (not shown) can be used to provide an environmental reading indicating whether the digital camera 10 is being operated underwater. Similarly, a Global Positioning System (GPS) sensor (not shown) can be used to provide an environmental reading indicating a geographical location, or an inertial motion sensor such as a gyroscope or an accelerometer can be used to provide an environmental reading indicating a camera motion or orientation. In a preferred embodiment, all of this metadata 170 is stored using standardized tags within the well-known Exif-JPEG still image file or within the H.264 video image file.

FIGS. 3A-3C are drawings which depict the camera body 400 of the digital camera 10. FIG. 3A is a drawing depicting a rear view of the camera body 400, FIG. 3B is a drawing depicting a front and top view of the camera body 400, and FIG. 3C is a drawing depicting a rear and bottom view of the camera body 400.

The camera body 400 of the digital camera 10 includes a first surface 410 having an image display 32, as shown in FIG. 3A. The image display 32 is used for displaying captured digital images, as described earlier in reference to FIG. 1.

The camera body 400 of the digital camera 10 also includes a second surface 420, opposite to the first surface 410, as shown in FIG. 3B. The first image capture system 1A (FIG. 1), which includes the first image sensor 14A (FIG. 1) and the first lens 4A that forms an image of a scene onto the first image sensor 14A (FIG. 1), has an optical axis A directed outward from the second surface 420.

The camera body 400 of the digital camera 10 also includes a third surface 430 transverse to the first surface 410 and the second surface 420. The third surface 430 has a smaller surface area than the first surface 410 (and likewise the second surface 420). Generally, the surface area of the third surface should be less than 40% of the surface area of the first surface 410. Preferably, the surface area of the third surface is between 5% and 20% of the surface area of the first surface 410. The second image capture system 1B (FIG. 1), which includes the second image sensor 14B (FIG. 1) and the second lens 4B that forms an image of a scene onto the second image sensor 14B (FIG. 1), has an optical axis B directed outward from the third surface 430.

The camera body 400 of the digital camera 10 also includes a fourth surface 440 opposite to the third surface 430. A first camera mount 415 is positioned on the fourth surface 440 to facilitate the camera body 400 being mounted to a support (as will be described later in reference to FIGS. 4 and 5) such that the first optical axis A is oriented in a substantially horizontal direction. In other embodiments, the first camera mount 415 can alternatively be positioned on the third surface 430.

A second camera mount 425 is positioned on the second surface 420 to facilitate the camera body 400 being mounted to a support such that the second optical axis B is oriented in a substantially horizontal direction. In other embodiments, the second camera mount 425 can alternatively be positioned on the first surface 410.

The smaller surface area of the third surface 430 provides a lower profile when the camera body 400 is positioned such that the optical axis B is oriented in a substantially horizontal direction. This is advantageous for applications where the digital camera 10 is used in a situation where the user is in motion, such as when it is mounted to a user's helmet while they are skiing, or when it is mounted to a bike handlebar. The lower profile provides a reduced wind resistance and a reduced risk of damage (e.g., due to interference with overhanging branches) The reduced wind resistance has the additional advantage that it provides reduced wind noise in the audio tracks of captured videos. Preferably the camera body 400 has a streamlined profile having rounded edges to further reduce wind resistance. The camera body 400 also has a lower center of gravity in this orientation. The reduced center of gravity is advantageous for reducing vibrations.

In some embodiments, the first lens 4A and the second lens 4B have different focal lengths for capturing different fields-of-view of the scene. Likewise, the first image sensor 14A and the second image sensor 14B can have different resolutions (i.e., different numbers of light-sensitive image pixels) and quality levels. For example, the first image capture system 1A with the first lens 4A and first image sensor 14A will be more likely to be used in a hand-held still photography mode where a high-resolution, high-quality image sensor is of great importance. Similarly, the second image capture system 1B with the second lens 4B and second image sensor 14B will be more likely to be used in an action video capture mode where a wide-angle lens having a wider field of view is generally desirable and where a high resolution/quality image sensor is not as critical. The wider field-of-view has the advantage that it captures a larger portion of the scene which is generally preferred during action shots, and is also less sensitive to image stability problems. The use of a lower resolution/quality sensor has the advantage that it will typically have a lower cost, and can also have a smaller physical size (which is desirable for mechanical design considerations), while still providing adequate image quality for capturing a good-quality HD video.

In some embodiments, the first camera mount 415 and the second camera mount 425 are tripod mounting screws conforming to the well-known international standard ISO 1222:2010, Photography-Tripod connections, which is available from the International Organization for Standardization, Geneva, Switzerland. In other embodiments, the first camera mount 415 or the second camera mount 425 can use other types of mounting interfaces, including proprietary custom interfaces using connection means such as screws, pins, clips, latches or magnets.

The camera body 400 of the digital camera 10 provides a camera user interface including an image path control 401 for selecting between the first image capture system 1A and the second image capture system 1B. In some embodiments, the image path control 401 can also be used to select an image capture mode where both the first image capture system 1A and the second image capture system 1B are simultaneously used to capture images. A capture operation control 402 is also provided for initiating an image capture operation using the selected first image capture system 1A or second image capture system 1B, and a power control 403 which enables the user to turn the digital camera 10 off and on. In some embodiments, the image path control 401 enables the user to select a low power mode, and in other embodiments, the power control 403 enables the user to select a low power mode, as will be described later in reference to FIG. 6.

In some embodiments, when the image path control 401 is used to select between the first image capture system 1A and the second image capture system 1B, various camera settings can be adjusted accordingly. For example, a different default image capture mode can be automatically selected in each case. In some embodiments, when the user selects a particular image capture system, the camera settings are set to the values that the user had selected the last time that the digital camera 10 had been set to use that image capture system. This enables the user to define different default settings for the first image capture system 1A and the second image capture system 1B without needing to manually reset them each time that the image capture system is changed.

The camera body 400 of the digital camera 10 includes a memory card access door 444 for accessing a removable memory card 442. The removable memory card 442 provides the image memory 30 (shown in FIG. 1) which is used as a storage memory for storing digital images captured using the selected first image capture system 1A or the second image capture system 1B. The camera body 400 of the digital camera 10 includes a connector access door 446 that can be used to access various connectors such as a power cable connector or a USB cable connector.

Figure 4A:
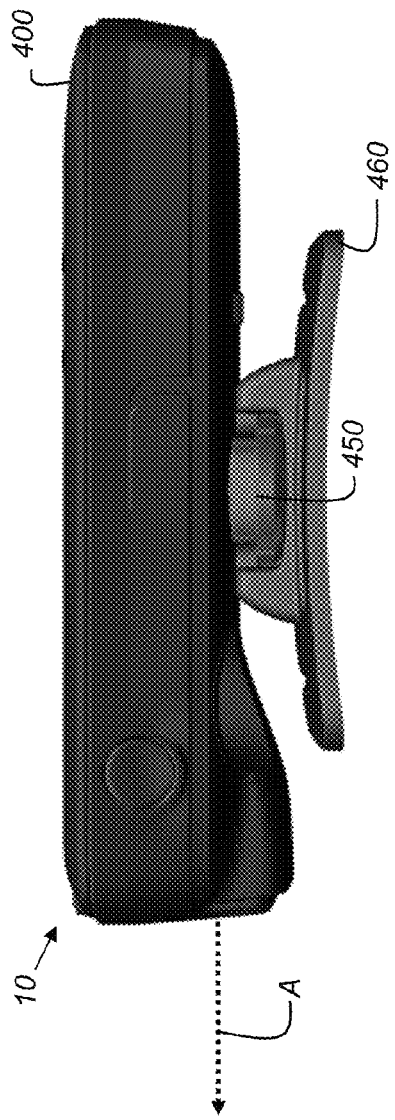
FIG. 4A is a drawing depicting the digital camera of FIGS. 3A-3C mounted using a helmet mount.

FIG. 4A is a drawing depicting the camera body 400 of the digital camera 10 mounted using a helmet mounting clip 460 which is attached to the second camera mount 425 (FIG. 3B) on the second surface 420 (FIG. 3B) of the camera body 400 using a quick release tab 450.

Figure 4C:
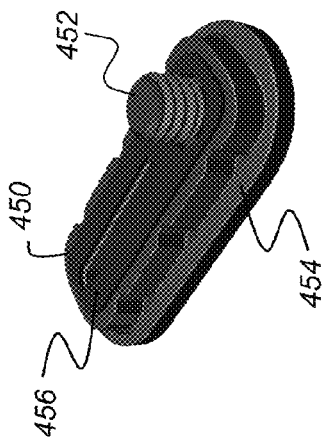
FIG. 4C is a drawing depicting the helmet mount stud from FIG. 4A.
Figure 4B:
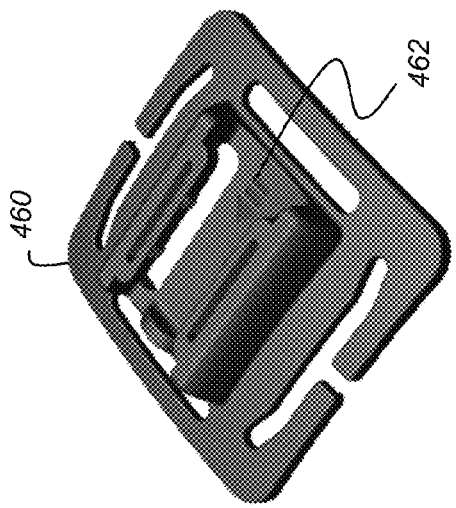
FIG. 4B is a drawing depicting the helmet mount clip from FIG. 4A.

FIG. 4B is a drawing depicting the helmet mounting clip 460. The helmet mounting clip 460 can be attached to a protective helmet (not shown), such as a bike helmet, motorcycle helmet, skate board helmet, skydiving helmet, or ski helmet, using Velcro, double-sided tape, or a strap (not shown). The helmet mounting clip 460 includes a slot 462 into which the quick release tab 450 can slide. While the helmet mounting clip 460 is nominally adapted for mounting the digital camera 10 to a helmet, it should be noted that the helmet mounting clip 460 can be attached to many other types of objects as well, such as a surfboard or a car bumper.

FIG. 4C is a drawing depicting the quick release tab 450. A screw 452 is used to secure the quick release tab 450 to the second camera mount 425 on the second surface 420 (or the first camera mount 415 on the fourth surface 440) of the camera body 400. The edge portion 454 of the quick release tab 450 has a reduced thickness, relative to the thickness of a central portion 456 of the quick release tab 450, to enable the quick release tab 450 to be inserted in the slot 462 of the helmet mounting clip 460, or into a bar mount, which will be described later relative to FIGS. 5A-5B.

Figure 5B:
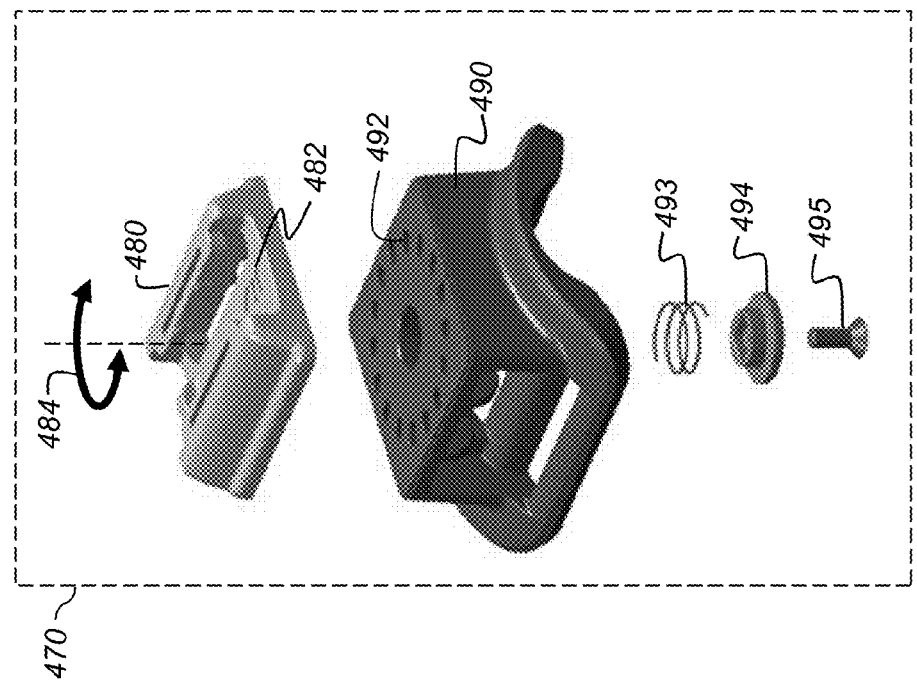
FIG. 5B is an exploded view depicting the components of the bar mount of FIG. 5A.
Figure 5A:
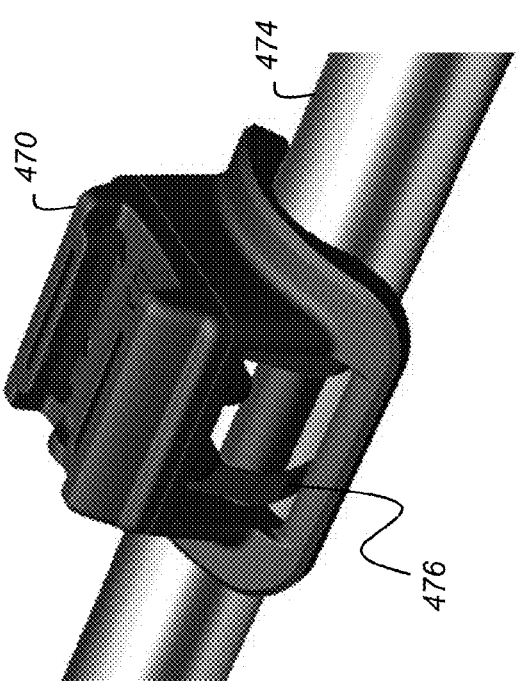
FIG. 5A is a drawing depicting a bar mount for a digital camera.

FIG. 5A is a drawing depicting a bar mount 470 for use to attach the camera body 400 (FIG. 3A) of the digital camera 10 to a bar 474. The bar 474 can be, for example, the handlebar of a bike or a motorcycle, or can be a ski pole, roof rack pole, or the mast of a sailboat or windsurfer. In some embodiments, the bar mount 470 is attached to the bar 474 using straps 476. In other embodiments, the bar mount can be attached using some other mounting mechanism such as cable ties or bolts.

FIG. 5B is an exploded view depicting the components of the bar mount 470. The bar mount 470 includes a mount rail 480 which includes a slot 482 into which the quick release tab 450 (FIG. 4C) can slide. The bar mount 470 also includes a mount base 490. In a preferred embodiment, the lower surface of the mount base includes elastomar strips (not shown) for gripping the bar 474 (FIG. 5A). The bar mount 470 is secured to the bar 474 using straps 476 (FIG. 5A) or some other mounting mechanism.

The mount rail 480 is attached to the mount base 490 using a screw 495, a washer 494, and a spring 493. The spring 493 enables the mount rail 480 to be lifted and then rotated relative to the mount base 490 in the direction generally shown by arrow 484. This enable the mount rail 480 to be positioned above the mount base 490 into one of 16 detent positions, corresponding to the positions of the 16 holes 492.

Figure 6:
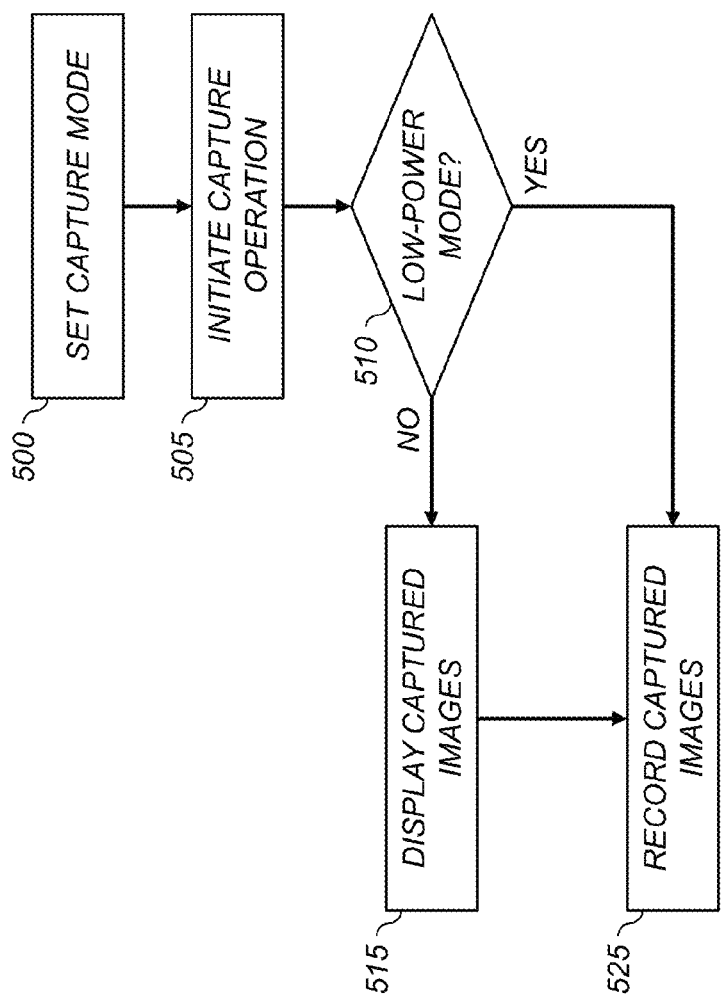
FIG. 6 is a flowchart showing steps for controlling a digital camera having a low-power image capture mode.

FIG. 6 is a flowchart showing steps for controlling the digital camera 10 (FIGS. 3A-3C) according to a normal image capture mode and a low-power image capture mode. In set capture mode step 500, the digital camera 10 is set to operate in either the normal image capture mode or the low-power image capture mode.

In some embodiments, the image capture mode is set in response to user activation of the image path control 401 (FIG. 3B), which also selects the first image capture system 1A or the second image capture system 1B (FIG. 1). In such embodiments, when the first image capture system 1A is selected, the normal image capture mode is preferably used and when the second image capture system 1B is selected, the low power image capture mode is preferably used. The processor 20 (FIG. 1) in the digital camera 10 responds to the user activation of the image path control 401 to select the first image capture system 1A by setting the mode of the camera power manager 42 (FIG. 1) to be in the normal image capture mode and setting the multiplexer 17 to output the digital image data from ASP and A/D converter 16A. The processor 20 responds to the user activation of the image path control 401 to select the second image capture system 1B by setting the mode of the camera power manager 42 to be in the low power image capture mode and setting the multiplexer 17 to output the digital image data from ASP and A/D converter 16B.

In some other embodiments, the power control 403 (FIG. 3B) is used to select the low power image capture mode, rather than using the image path control 401. For example, the power control 403 is first used to turn on the digital camera 10. The user then uses the image path control 401 to select either the first image capture system 1A or the second image capture system 1B. The user can then mount the digital camera 10 to their bike helmet, before placing the bike helmet on their head, as described earlier in reference to FIG. 4A. The user can then press and release the power control 403 in order to place the digital camera 10 in the low power mode. Finally, the user can place the helmet on their head and use the remote control module 200 (FIG. 1) to initiate image capture operations.

In initiate capture operation step 505, the processor 20 (FIG. 1) initiates an image capture operation in response to user activation of an appropriate user control. In some embodiments, the user control is the capture operation control 402 (FIG. 3A). In other embodiments, the user control is included in the remote control module 200 (FIG. 1), which will be described later in reference to FIGS. 7A-B. The processor 20 initiates the image capture operation by beginning the capture of a digital video (or a burst image sequence or a time-lapse image sequence), or capturing a digital still image, as described earlier in reference to FIGS. 1 and 2.

In low-power mode test 510, the processor 20 determines whether the camera power manager 42 (FIG. 1) has been set to the low-power image capture mode. If the low-power mode test 510 determines that the digital camera 10 is not in the low-power image capture mode (i.e., it is in the normal image capture mode), a display captured images step 515 is used to display the captured digital images on the image display 32 (FIG. 1). This is appropriate, for example, when the user is hand-holding the digital camera 10 while capturing a video clip.

In record captured images step 525, the captured digital video images or digital still images are recorded in the image memory 30 (FIG. 1). The image memory 30 can be the removable memory card 442 described earlier in reference to FIG. 3B.

If the low-power mode test 510 determines that the digital camera 10 is in the low-power image capture mode, the captured images are not displayed on the image display 32 in order to reduce the power consumption, and the process proceeds to the record captured images step 525. This is appropriate, for example, when the digital camera 10 is mounted to a user's bike helmet while capturing a still image or a video clip, since, in this case, the user is unable to view the image display 32.

In some embodiments, if the user activates an appropriate user control to switch between the low-power image capture mode and the normal image capture mode while a digital video image is being captured, the camera power manager 42 switches the image capture mode between the low-power image capture mode and the normal image capture mode without interrupting the video capture process. For example, a user may mount the digital camera 10 in an appropriate position (for example on a tripod or a bicycle handlebar) and initiate a video capture process while the digital camera 10 is operating in the normal image capture mode. However, once the video capture process is initiated the user may desire to switch to the low-power image capture mode to conserve battery power after confirming that the image is properly framed. In response to activation of the appropriate user control, the camera power manager 42 will switch to the low-power image capture mode, without interrupting the video capture process.

In some embodiments, a live preview image is displayed on the image display 32 before an image capture operation is initiated when the digital camera is set to operate in the normal image capture mode, but no live preview image is displayed when the digital camera is set to operate in the low-power image capture mode.

In some embodiments, the digital camera 10 automatically enters the low-power image capture mode after a predefined period of inactivity (e.g., a period during which the user has not activated any camera features and the camera is not recording), or when the power level of the camera batteries 43 (FIG. 1) falls below a predefined threshold.

It will be understood that when the digital camera 10 is set to operate in the normal image capture mode, captured digital images are displayed on the image display 32 as they are captured, and when the digital camera 10 is set to operate in the low-power image capture mode, captured digital images are not displayed on the image display 32 as they are captured. It will be further understood that the recorded digital images that were captured in either the normal image capture mode or the low-power image capture mode can be viewed on the image display 32 (FIG. 1) at a later time when the digital camera 10 is set to a review mode.

FIG. 7A is a high-level diagram showing the components of the remote control module 200 of FIG. 1. FIG. 7B is a drawing of a front view of the remote control module 200 shown in FIG. 7A according to one embodiment. The remote control module 200 can include a wrist strap 280 which secures the remote control module 200 to a wrist of the user, or to some other object such as a bicycle handlebar. In this way, the remote control module 200 can be accessible as the user engages in an activity such as mountain biking or surfing. In some embodiments, the remote control module 200 can include a mounting interface that enables it to be mounted to various objects or surfaces. For example, the remote control module 200 can include a tripod mount (similar to the first camera mount 415 shown in FIG. 3C) or include a tab that is adapted to be connected to the slot 482 in the bar mount 470 of FIG. 5B.

The remote control module 200 includes a processor 220 which controls the functions of the remote control module 200 using instructions stored in firmware memory 228. In some embodiments, the processor 220 is a microprocessor which also includes a read only memory (ROM) or a programmable read only memory (PROM) which stores firmware instructions that are executed by the processor 220. In some embodiments, a firmware memory 228 can be used to store firmware instruction. It will be understood that in some embodiments, the processor 220 can be provided by custom circuitry (e.g., by one or more custom integrated circuits (ICs) designed specifically for use in wireless remote controls), or by a combination of programmable processors and custom circuits. It will be understood that connections between the processor 220 and some or all of the various components shown in FIG. 7A can be made using a common data bus (not shown).

The processor 220 interfaces with a remote control power manager 248, which controls the power provided by remote batteries 240, as will be described later in reference to FIG. 8. The processor 220 also interfaces with a wireless modem 250, which communicates with the digital camera 10 (FIG. 1) over the wireless network 52. As described earlier with reference to the wireless modem 50 (FIG. 1) in the digital camera 10, the wireless modem 250 in the remote control module 200 can use various wireless interface protocols, such as the well-known Bluetooth wireless interface or the well-known 802.11 wireless interface, or various proprietary protocols.

The processor 220 receives inputs from user controls 234 and controls a status display 232. The user controls 234 can include a status button 270 for requesting status information for the digital camera 10, a record button 272 for initiating an image capture operation (e.g., a video record operation or a still image capture operation), and a book mark button 274 for marking important portions of a captured video, as shown in FIG. 7B. It will be understood that in other embodiments, other types of user controls can be employed, such as described earlier in reference to user controls 34 in FIG. 1. For example, a user control can be provided to enable the user to select between the first image capture system 1A or the second image capture system 1B. User controls 234 on the remote control module 200, such as the record button 272, that are used to send a command to the digital camera 10 can be referred to as command user controls.

The status display 232 can be a liquid crystal display (LCD) a group of light emitting diodes (LEDs), or can use any other display technology known in the art. The status display 232 includes status display elements for displaying status information pertaining to the digital camera 10 (FIG. 1). For example, the status display 232 shown in FIG. 7B includes a battery level display element 260 for displaying a charge level of the camera batteries 43 (FIG. 1) in digital camera 10, a signal strength display element 262 for displaying a level of the signal received by the wireless modem 250, a memory fullness display element 264 for displaying an indication of the fullness of the image memory 30 (FIG. 1) in the digital camera 10, and a time display element 266 for displaying time information. In some embodiments the time information can be the time obtained from a real-time clock (not shown) in the digital camera 10. In some embodiments, when the digital camera 10 is in the process of capturing a digital video the time information can be the elapsed time since a video recording operation (or a time-lapse photography operation) was initiated. It will be understood that in other embodiments, other types of display elements can be used to display other information that would be of interest to the user, for example the settings of various camera modes and parameters, as described earlier in reference to FIG. 2. In some embodiments, the status display 232 can display a record status display element providing an indication of whether the digital camera 10 is currently recording a digital video (or a time-lapse digital image sequence). Alternately, the record status can be indicated by other means such as by providing a separate signal light, or by activating a back light for the record button 272.

In some embodiments, a single remote control module 200 can be used to control a plurality of different digital cameras 10. In this case, the remote control module 200 can include user controls that enable the user to specify which of the plurality of digital cameras 10 should be controlled at a particular time.

Figure 8:
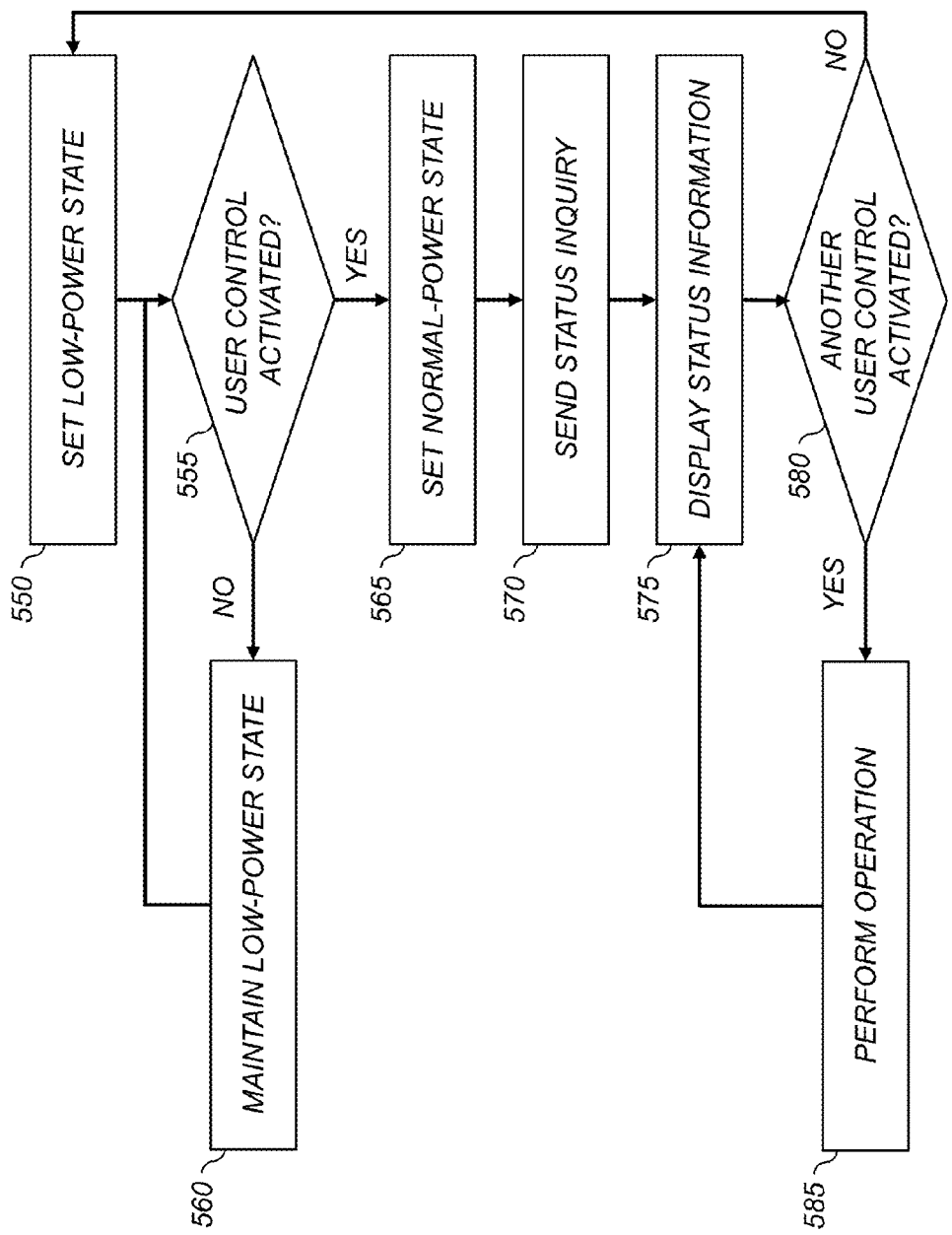
FIG. 8 is a flowchart showing steps for managing the power in a digital camera system including a remote control module.

FIG. 8 is a flowchart showing steps for managing the power in a digital camera system including the digital camera 10 and the remote control module 200. In set low-power state step 550, the processor 220 in the remote control module 200 controls the remote control power manager 248 in order to set the remote control module 200 to operate in a low-power state after a period of inactivity. In some embodiments, the period of inactivity is a fixed predetermined period, such as 60 seconds. In other embodiments, the period of inactivity is a function of the power level of the remote batteries 240. In other embodiments, the period of inactivity is a user-adjustable predetermined period. For example, the predetermined period can be an inactivity time value selected from a plurality of values (e.g., 10 seconds, 60 seconds, 5 minutes and 1 hour) selected using one of the user controls 234 on the remote control module 200. In some embodiments, the time value can be selected using the user controls 34 (FIG. 1) on the digital camera 10, which then communicates the value to the remote control module 200 over the wireless network 52. The status display 232 and the wireless modem 250 are powered down in the low-power state.

In user control activated test 555, the processor 220 in the remote control module 200 determines whether one of the user controls 234 has been activated by the user. If the user control activated test 555 determines that none of the user controls 234 have been activated by the user a maintain low-power state step 560 maintains the low-power state described earlier in reference to the set low-power state step 550.

If the user control activated test 555 determines that one of the user controls 234 has been activated by the user, a set normal-power state step 565 is used to control the remote control power manager 248 in order to set the remote control module 200 to operate in a normal-power state. In the normal-power state, power is supplied to the status display 232 and the wireless modem 250.

In send status inquiry step 570, the processor 220 in the remote control module 200 sends a status inquiry to the digital camera 10 over the wireless network 52 using the wireless modem 250. In response, the digital camera 10 sends status information back to the remote control module 200 over the wireless network 52 using the wireless modem 50 in the digital camera 10.

In display status information step 575, the received status information is displayed on the status display 232 of the remote control module 200. The status information is displayed using the status display elements described earlier in reference to FIG. 7B (i.e., the battery level display element 260, the signal strength display element 262, the memory fullness display element 264 and the time of day display element 266).

Following display status information step 575, a user control activated test 580 waits to see whether the user activates one of the user controls 234 during the predefined time interval. If so, a perform operation step 585 performs the operation requested by the user (for example, initiating an image capture operation). The display status information step 575 is then called to update the information displayed on the status display 232 accordingly. If the user control activated test 580 does not detected the activation of any user controls 234 during the predefined time interval, the set low-power state step 550 is repeated to return the remote control module 200 to the low-power mode.

In some embodiments, at least some of the status display elements on the remote control module 200 are powered down after a predefined second shorter time interval. This enables the remote control module 200 to conserve additional power while it remains in the normal-power mode. In this case, certain status display elements may remain powered up as appropriate. For example, a record status display element may remain powered up during the time that a digital video is being captured even if the user has not interacted with the user controls.

In some embodiments, the digital camera 10 can transmit captured digital images (either digital still images or digital videos) to the remote control module 200 over the wireless connection for display on the status display 232. For example, during the time that the digital camera 10 is capturing a digital video, a temporal sequence of video frames can be transmitted to the remote control module 200 so that the user can monitor the capture process. In some cases, the digital camera 10 may down-sample the video frames spatially or temporally before transmitting them to the remote control module 200 in order to minimize the amount of bandwidth required to transmit the video frames. Similarly, if the digital camera 10 is operating in a still capture mode, a sequence of preview images can be transmitted to the remote control module 200 to allow the user to determine an appropriate time for initiating an image capture operation.

The invention has been described in detail with particular reference to certain preferred embodiments thereof, but it will be understood that variations and modifications can be effected within the spirit and scope of the invention.

PARTS LIST 1A image capture system
1B image capture system
4A lens
4B lens
10 digital camera
12 timing generator
14A image sensor
14B image sensor
16A ASP and A/D Converter
16B ASP and A/D Converter
17 multiplexer
18 buffer memory
20 processor
22 audio codec
24 microphone
26 speaker
28 firmware memory
30 image memory
32 image display
34 user controls
36 display memory
38 wired interface
40 computer
42 power manager
43 camera batteries
44 video interface
46 video display
48 interface/recharger
50 wireless modem
52 wireless network
70 Internet
72 service provider
74 wireless access point
90 white balance setting
95 white balance step
100 color sensor data
105 noise reduction step
110 ISO setting
115 demosaicing step
120 resolution mode setting
125 color correction step
130 color mode setting
135 tone scale correction step
140 contrast setting
145 image sharpening step
150 sharpening setting
155 image compression step
160 compression mode setting
165 file formatting step
170 metadata
175 user settings
180 digital image file
185 camera settings
190 environmental readings
200 remote control module
220 processor
228 firmware memory
232 status display
234 user controls
240 remote batteries
248 remote control power manager
250 wireless modem
260 battery level display element
262 signal strength display element
264 memory fullness display element
266 time of day display element
270 status button
272 record button
274 bookmark button
280 wrist strap
400 camera body
401 image path control
402 capture operation control
403 power control
410 first surface
415 first camera mount
420 second surface
425 second camera mount
430 third surface
440 fourth surface
442 removable memory card
444 memory card access door
446 connector access door
450 quick release tab
452 screw
454 edge portion
456 central portion
460 helmet mounting clip
462 slot 470 bar mount
474 bar
476 straps
480 mount rail
482 slot
484 arrow
490 mount base
492 holes
493 spring
494 washer
495 screw
500 set capture mode step
505 initiate capture operation step
510 low-power mode test
515 display captured images step
525 record captured images step
550 set low-power state step
555 user control activated test
560 maintain low-power state step
565 set normal-power state step
570 send status inquiry step
575 display status information step
580 another user control activated test
585 perform operation step
A optical axis
B optical axis

The invention claimed is:

1. A digital camera system, comprising:
an image capture module including:
a first image capture system including:
a first image sensor for capturing a digital image; and
a first optical system for forming an image of a first portion of a scene onto the first image sensor; and
a first wireless communication system; and
a remote control module including:
a remote control status display including one or more remote control status display elements for displaying status information pertaining to the image capture module;
a battery-operated power supply;
one or more remote control user controls;
a second wireless communication system for communicating with the first wireless communication system using a wireless interface; and
a power management system providing a normal-power state where the remote control status display and the second wireless communication system are active and a low-power state where the remote control status display and the second wireless system are inactive;
wherein when none of the remote control user controls have been activated for a predefined first time interval the power management system sets the remote control module to operate in the low-power state;
and wherein when a user activates one of the remote control user controls while the remote control module is in the low-power state:
the power management system sets the remote control module to operate in the normal-power state;
the remote control module sends a status inquiry to the image capture module using the second wireless communication system, and in response the image capture module sends status information back to the remote control module using the first wireless communication system; and
the status information is displayed using the remote control status display elements of the remote control status display.

2. The digital camera system of claim 1 wherein while the remote control module is in the normal power mode at least some of the remote control status display elements are powered down when none of the remote control user controls have been activated for a predefined second time interval, the second time interval being shorter than the first time interval.

3. The digital camera system of claim 1 wherein the remote control user controls include one or more command user controls for sending commands to the image capture module.

4. The digital camera system of claim 3 wherein the image capture module is used to capture digital videos, burst image sequences or time-lapse digital image sequences, and wherein the command user controls include a user control for initiating and terminating the capture of a digital video, a burst image sequence or a time-lapse digital image sequence.

5. The digital camera system of claim 4 wherein the remote control status display elements include a record status display element that provides an indication of whether a digital video, a burst image sequence or a time-lapse digital image sequence is being captured, and wherein the record status display element remains powered up until the capture of the digital video, the burst image sequence or the time lapse digital image sequence is terminated.

6. The digital camera system of claim 1 wherein the remote control user controls include a status inquiry user control for sending a status request to the image capture module.

7. The digital camera system of claim 3 wherein when a user activates the status inquiry user control, status information received from the image capture module in response to the status request is displayed using the remote control status display elements of the remote control status display.

8. The digital camera system of claim 1 wherein the remote control status display elements include a battery power status display element, a memory status display element, a wireless signal strength status display element or a record status display element.

9. The digital camera system of claim 1 wherein the image capture module further includes a capture module power management system that sets the image capture module to a low-power state after a period of inactivity, wherein the first wireless communication system is still powered up in the low-power state in order to sense signals transmitted by the second wireless communication system.

10. The digital camera system of claim 1 wherein the image capture module further includes a second image capture system including:
a second image sensor; and
a second optical system for forming an image of a second portion of the scene onto the second image sensor, wherein the second optical system is oriented in a different capture direction from the first optical system;
wherein an imaging system selection user control is provided for enabling a user to select between the first image capture system and the second image capture system.

11. The digital camera system of claim 10 wherein one of the remote control user controls provides the function of the imaging system selection user control.

12. The digital camera system of claim 10 wherein the second image camera module further includes:
an image display; and
a power management system providing a normal image capture mode wherein captured digital images are displayed on the image display as they are captured and a low-power image capture mode wherein captured digital images are not displayed on the image display as they are captured;

wherein the image capture module is automatically placed in the low-power image capture mode in response to user selection of the second image capture system.

13. The digital camera system of claim 10 wherein the first optical system and the second optical system have different focal lengths for capturing different fields-of-view of the scene.

14. The digital camera system of claim 10 wherein the first image sensor and the second image sensor have different resolutions.

* * * * *